(12) United States Patent
Lee (10) Patent No.: US 9,393,928 B2
(45) Date of Patent: Jul. 19, 2016

(54) DIFFUSER POCKET FOR AIRBAG AND METHOD OF MANUFACTURING THE SAME

(71) Applicant: HYUNDAI MOBIS Co., Ltd., Yongin-si, Gyeonggi-do (KR)

(72) Inventor: Jong Seob Lee, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 88 days.

(21) Appl. No.: 14/253,913

(22) Filed: Apr. 16, 2014

(65) Prior Publication Data

US 2014/0306435 A1    Oct. 16, 2014

(30) Foreign Application Priority Data

Apr. 16, 2013 (KR) .................. 10-2013-0041709

(51) Int. Cl.
*B60R 21/261* (2011.01)
*B60R 21/2346* (2011.01)

(52) U.S. Cl.
CPC ........... *B60R 21/261* (2013.01); *B60R 21/2346* (2013.01); *B60R 2021/2617* (2013.01)

(58) Field of Classification Search
CPC   B60R 21/2346; B60R 21/261; B60R 21/262; B60R 2021/2617
See application file for complete search history.

(56) References Cited

U.S. PATENT DOCUMENTS

| | | | |
|---|---|---|---|
| 6,371,518 B1* | 4/2002 | Kalandek et al. | 280/743.1 |
| 6,382,662 B1* | 5/2002 | Igawa | 280/729 |
| 2003/0218324 A1* | 11/2003 | Ju et al. | 280/743.1 |
| 2004/0104561 A1* | 6/2004 | Maertens | 280/730.2 |
| 2004/0104563 A1* | 6/2004 | Fischer | 280/743.1 |
| 2009/0039627 A1* | 2/2009 | Yokota | 280/730.2 |
| 2009/0295134 A1* | 12/2009 | Wold et al. | 280/741 |
| 2010/0084841 A1* | 4/2010 | Suemitsu et al. | 280/730.2 |
| 2010/0164209 A1* | 7/2010 | Magnin et al. | 280/740 |
| 2010/0207368 A1* | 8/2010 | Weyrich | 280/736 |
| 2010/0276917 A1* | 11/2010 | Chavez et al. | 280/740 |
| 2012/0049496 A1* | 3/2012 | Gamill et al. | 280/742 |
| 2012/0313358 A1* | 12/2012 | Okamoto et al. | 280/740 |
| 2012/0313359 A1* | 12/2012 | Chavez et al. | 280/740 |
| 2013/0200596 A1* | 8/2013 | Goto et al. | 280/728.2 |
| 2014/0103625 A1* | 4/2014 | Thomas et al. | 280/730.2 |
| 2015/0014973 A1* | 1/2015 | Osterfeld et al. | 280/742 |

* cited by examiner

*Primary Examiner* — Barry Gooden, Jr.
(74) *Attorney, Agent, or Firm* — Paratus Law Group, PLLC (57) ABSTRACT

A diffuser pocket for an airbag according to the present invention includes: an insertion portion into which a tip portion of an inflator is inserted; and a gas discharging portion which guides and discharges high-pressure gas injected from the inflator to an airbag cushion, in which the insertion portion has front and rear insertion portions in which lower portions are folded and upper portions are sewn, and the gas discharging portion has front and rear gas discharging surfaces in which a left line is folded, and upper portions and left portions are sewed, thereby preventing damage due to high-temperature and high-pressure gas injected from the inflator.

14 Claims, 5 Drawing Sheets

DIFFUSER POCKET FOR AIRBAG AND METHOD OF MANUFACTURING THE SAME

CROSS-REFERENCE TO RELATED APPLICATIONS

The present application claims priority to Korean Patent Application Number 10-2013-0041709 filed Apr. 16, 2013, the entire contents of which the application is incorporated herein for all purposes by this reference.

TECHNICAL FIELD

The present invention relates to a diffuser pocket for an airbag, and more particularly, to a diffuser pocket which distributes and supplies high-pressure gas, which is generated from an inflator at the time of a vehicle collision, to an airbag cushion, and a method of manufacturing the same.

BACKGROUND

In general, an airbag system is a safety device for an occupant which allows an airbag to be deployed between an occupant and a vehicle structure at the time of a vehicle collision so as to prevent the occupant from directly colliding with the vehicle structure and minimize injury to the occupant.

The airbag system is installed at each region in the vehicle as necessary, and a driver seat airbag device which is mounted in a steering wheel in order to protect an upper body and a head of the occupant seated on a driver seat at the time of a frontal collision, an passenger set airbag device which is mounted at an upper side of a glove box so as to protect the occupant seated on a passenger seat, and a curtain airbag device which is mounted in a side of the vehicle in order to protect the occupant while being deployed between the occupant and a door at the time of a broadside collision are being used.

The curtain airbag is installed along a roof rail of a vehicle so as to protect the occupant while being deployed at the time of a broadside collision or an overturn accident after a broadside collision.

The curtain airbag device uses a steel pipe or a diffuser pocket in order to supply gas produced by the inflator to an airbag cushion, but there are problems in that a design of pattern of the steel pipe is important for leading gas immediately downward from the pipe because gas flows over front and rear sides, and the steel pipe is heavy and expensive.

Because the diffuser pocket is formed by folding a predetermined fabric and sewing outer edges of the diffuser pocket, there is a problem in that a sewed portion of the diffuser pocket is damaged due to high-temperature and high-pressure gas injected from an inflator. Particularly, because a lower side of a portion of the diffuser pocket into which a tip portion of the inflator is inserted is sewed, there are problems in that thermal damage occurs through a sewed gap, and the airbag cushion is also damaged.

SUMMARY

The present invention has been made in an effort to provide a diffuser pocket for an airbag, which prevents damage to the diffuser pocket due to high-temperature and high-pressure gas that is injected from an inflator at the time of a vehicle collision, and stably supplies high-pressure gas to an airbag cushion, thereby improving deployment performance of the airbag cushion.

Technical problems of the present invention are not limited to the aforementioned technical problems, and other technical problems, which are not mentioned above, may be clearly understood by those skilled in the art from the following descriptions.

An exemplary embodiment of the present invention provides a diffuser pocket for an airbag, including: an insertion portion into which at least a tip portion of an inflator, which injects high-pressure gas at the time of a vehicle collision, is inserted; and a gas discharging portion which guides and discharges high-pressure gas injected from the inflator to an airbag cushion, The insertion portion may include front and rear insertion surfaces that are folded upward based on a first folding line positioned at a center of the insertion portion, and upper portions of the front and rear insertion surfaces may be joined with each other by an attaching means, and the gas discharging portion may include front and rear gas discharging surfaces that are folded to one side based on a second folding line positioned at a center of the gas discharging portion, the second folding line may form a right line of the gas discharging portion, and upper portions and left portions of the front and rear gas discharging surfaces may be joined with each other by an attaching means.

A first superposition surface may be positioned between portions where the front insertion surface and the front gas discharging surface overlap each other, and a second superposition surface may be positioned between portions where the rear insertion surface and the rear gas discharging surface overlap each other.

The diffuser pocket may be made of a single fabric.

Sewing may be selected as the attaching means.

The insertion portion may be formed in a quadrangular shape, the first and second superposition surfaces may be formed in a triangular shape, and the gas discharging portion may be formed in a polygonal shape having five vertices or more.

The first and second superposition surfaces may be positioned between the front and rear insertion surfaces and the front and rear gas discharging surfaces by folding superposition portions positioned between the insertion portion and the gas discharging portion, and the first and second superposition surfaces may be formed by folding a third folding line, which is a left line of the insertion portion, so that a sixth folding line, which is positioned between the first and second folding lines, is in contact with a part of the first folding line, and folding fourth and fifth folding lines that connects portions where front and rear ends of the third folding line are in contact with the second and sixth folding lines.

A reinforcing fabric, which has a gas guide portion that is extended downward from the diffuser pocket, may be coupled to the diffuser pocket, and the gas guide portion may have a lower end that is closed by being sewed, and gas discharging openings that is formed at both sides of the gas guide portion.

Another exemplary embodiment of the present invention provides a method of manufacturing a diffuser pocket for an airbag, including: a cutting process for cutting a single fabric so as to form an insertion portion into which a tip portion of an inflator is inserted, and a gas discharging portion which is disposed at a left side of the insertion portion so as to guide and discharge high-pressure gas injected from the inflator to an airbag cushion; a folding process for folding the gas discharging portion to a bottom side of the insertion portion based on a folding line that is a left line of the insertion portion, folding front and rear insertion surfaces of the insertion portion upward based on a folding line that is positioned in a horizontal direction at a center of the insertion portion, and folding front and rear gas discharging surfaces of the gas discharging portion to one side based on a folding line that is positioned in a horizontal direction at a center of the gas discharging portion; and a sewing process for sewing upper portions of the front and rear insertion surfaces, and upper portions and left portions of the front and rear gas discharging surfaces.

In the folding process, the insertion portion and the gas discharging portion may be folded so that parts of the insertion portion and the gas discharging portion overlap each other, and the insertion portion and the gas discharging portion may be folded so that a superposition surface is positioned between portions where parts of the insertion portion and the gas discharging portion overlap each other.

The superposition surface may be positioned between portions where the insertion portion and the gas discharging portion overlap each other, by folding the diffuser pocket based on a folding line that is connected between a folding line positioned at a center of the insertion portion and a folding line positioned at a center of the gas discharging portion, and based on a folding line that is inclinedly connected to front and rear ends of a folding line which is a left line of the insertion portion and a folding line positioned at a center of the gas discharging portion.

In the cutting process, the insertion portion may be formed in a quadrangular shape, and the gas discharging portion may be formed in a polygonal shape having six vertices or more that has a width in a forward and rearward direction wider than that of the insertion portion.

The diffuser pocket for an airbag and the method of manufacturing the same according to the present invention may improve rigidity of the diffuser pocket, thereby preventing damage to the diffuser pocket and the airbag cushion that may be caused by high-temperature and high-pressure gas injected from the inflator.

The effects of the present invention are not limited to the aforementioned effects, and other effects, which are not mentioned above, will be clearly understood by those skilled in the art from the claims.

DETAILED DESCRIPTION

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the description of the present invention complete and are set forth to provide a complete understanding of the scope of the invention to a person with ordinary skill in the art to which the present invention pertains, and the present invention is defined by the scope of the claims. Like reference numerals indicate like elements throughout the specification.

Hereinafter, a diffuser pocket for an airbag according to exemplary embodiments of the present invention will be described with reference to the drawings.

Figure 1:
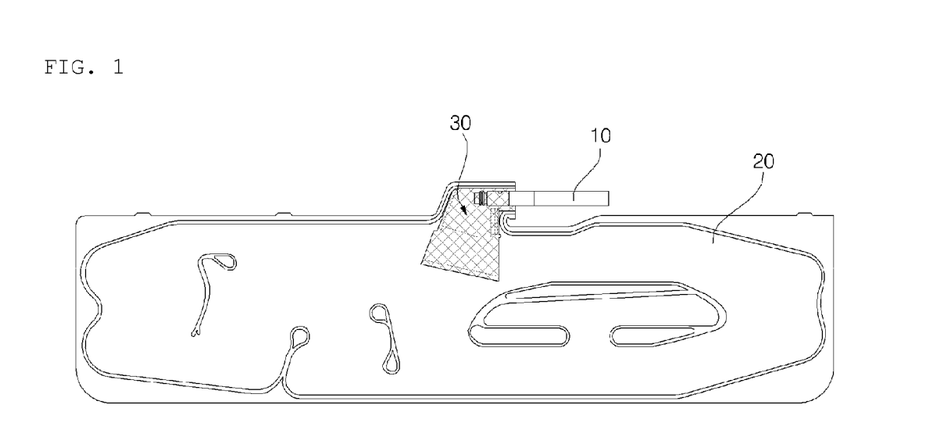
FIG. 1 is a cross-sectional view illustrating a curtain airbag device for a vehicle.
Figure 2:
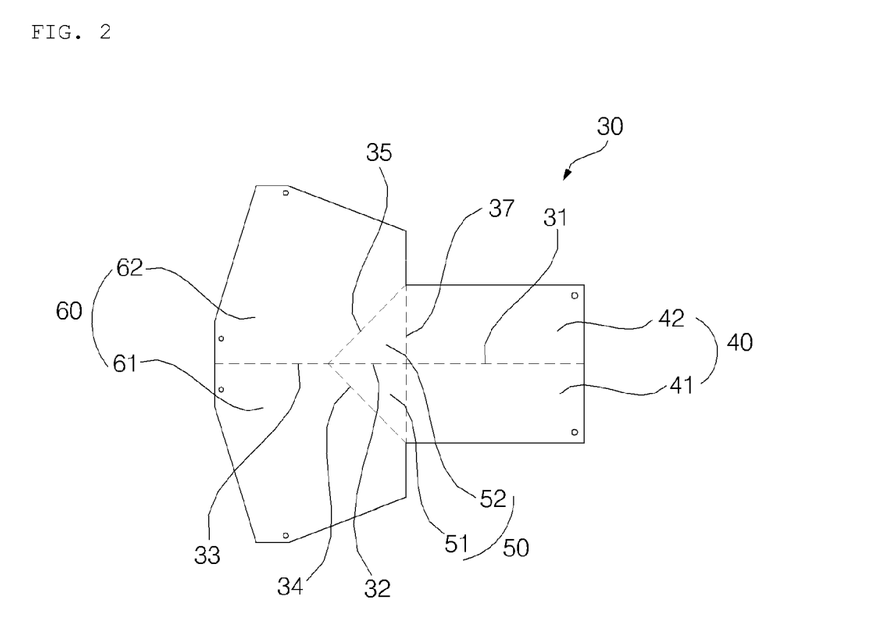
FIG. 2 is a development view of a diffuser pocket according to a first exemplary embodiment of the present invention.
Figure 3:
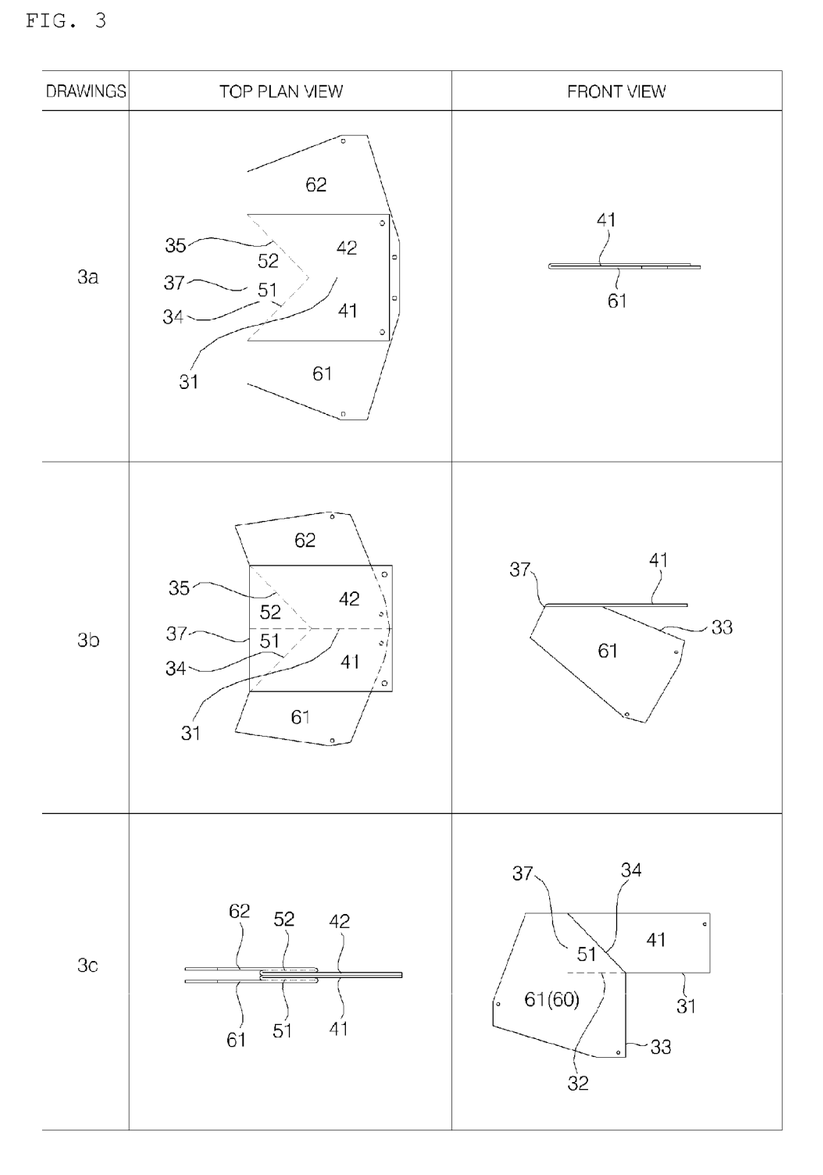
FIG. 3 is a view illustrating a sequence of folding the diffuser pocket according to the first exemplary embodiment of the present invention.
Figure 4:
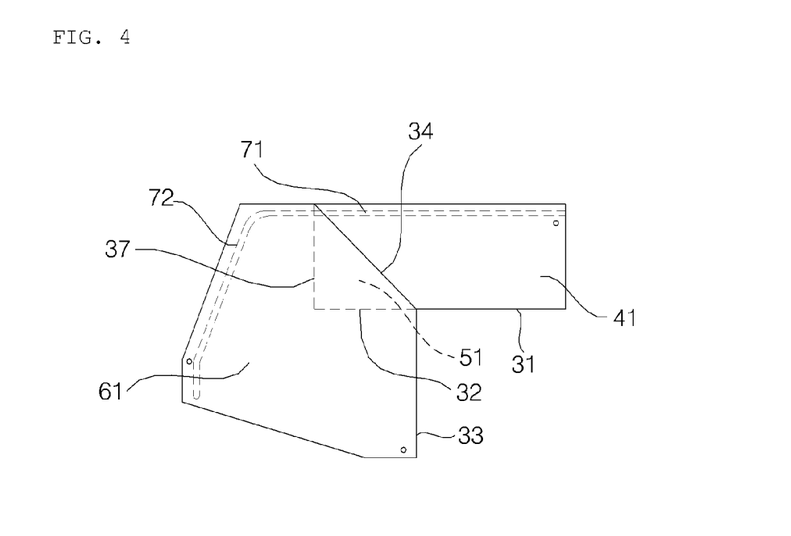
FIG. 4 is a front view of the diffuser pocket according to the first exemplary embodiment of the present invention.
Figure 5:
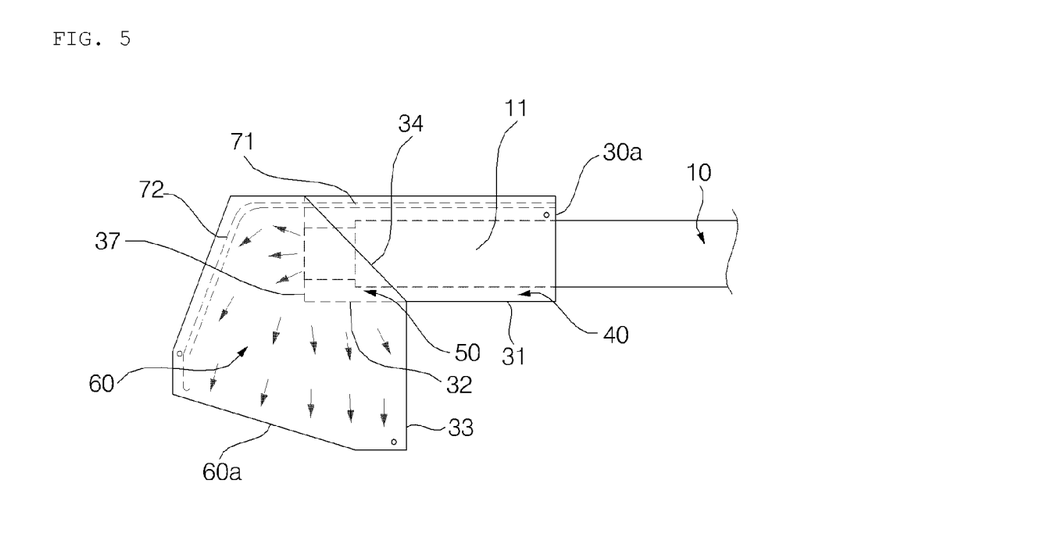
FIG. 5 is a front view illustrating a state in which an inflator is inserted into the diffuser pocket according to the first exemplary embodiment of the present invention.
Figure 6:
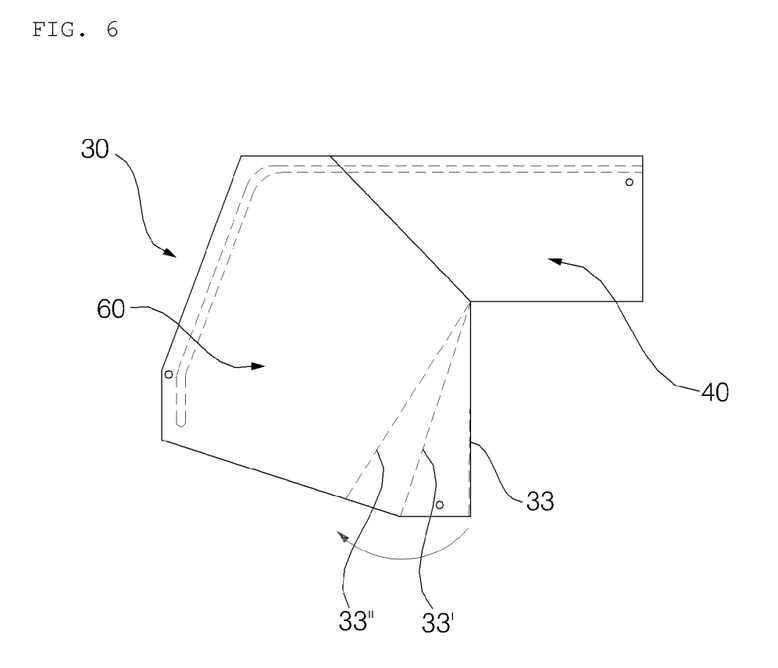
FIG. 6 is a front view of a diffuser pocket according to a second exemplary embodiment of the present invention.
Figure 7:
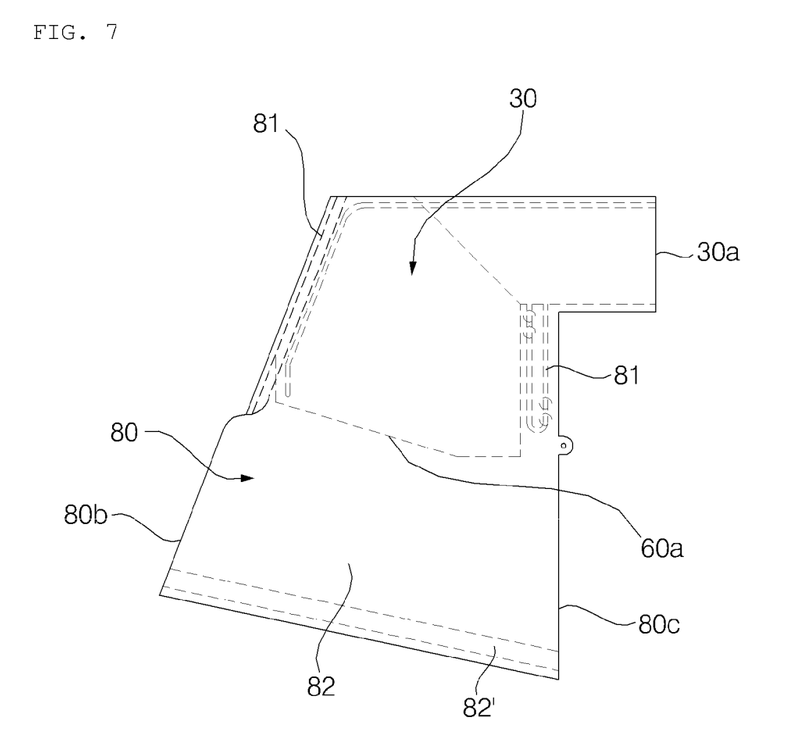
FIG. 7 is a front view of a diffuser pocket according to a third exemplary embodiment of the present invention.

FIG. 1 is a cross-sectional view illustrating a curtain airbag device for a vehicle, FIG. 2 is a development view of a diffuser pocket according to a first exemplary embodiment of the present invention, FIG. 3 is a view illustrating a sequence of folding the diffuser pocket according to the first exemplary embodiment of the present invention, FIG. 4 is a front view of the diffuser pocket according to the first exemplary embodiment of the present invention, FIG. 5 is a front view illustrating a state in which an inflator is inserted into the diffuser pocket according to the first exemplary embodiment of the present invention, FIG. 6 is a front view of a diffuser pocket according to a second exemplary embodiment of the present invention, and FIG. 7 is a front view of a diffuser pocket according to a third exemplary embodiment of the present invention.

As illustrated in FIG. 1, a curtain airbag device for a vehicle includes an inflator 10 which injects high-pressure gas at the time of a vehicle collision, an airbag cushion 20 which is deployed toward a vehicle side by high-pressure gas that is injected from the inflator 10 and flows into the airbag cushion 20, and a diffuser pocket 30 which is installed in the airbag cushion 20 and guides high-pressure gas injected from the inflator 10 into the airbag cushion 20.

As illustrated in FIGS. 2 to 5, the diffuser pocket 30 according to a first exemplary embodiment of the present invention includes an insertion portion 40 into which a tip portion of the inflator 10 is inserted, and a gas discharging portion 60 which is positioned at a left lower side of the insertion portion 40 and guides high-pressure gas injected from the inflator 10 to the airbag cushion.

The insertion portion 40 has front and rear insertion surfaces 41 and 42 that are folded upward along a horizontal first folding line 31 positioned at a center of the insertion portion 40, upper portions of the front and rear insertion surfaces 41 and 42 are joined with each other by being sewn together 71, and a first opening portion 30a for inserting the inflator is formed at a right portion of the insertion portion 40.

The gas discharging portion 60 has front and rear gas discharging surfaces 61 and 62 that are folded upward along a horizontal second folding line 33 positioned at a center of the gas discharging portion 60, the second folding line 33 forms a right line of the gas discharging portion 60, and upper portions, and side portions, which are positioned to face the second folding line 33, of the front and rear gas discharging surfaces 61 and 62 are joined with each other by being sewn together 72, and a second opening portion 60a for discharging gas is formed at a lower end of the gas discharging portion 60.

Meanwhile, a first superposition surface 51 is positioned between portions where the front insertion surface 41 and the front gas discharging surface 61 overlap each other, and a second superposition surface 52 is positioned between portions where the rear insertion surface 42 and the rear gas discharging surface 62 overlap each other.

The first and second superposition surfaces 51 and 52 are formed by folding the diffuser pocket along a third folding line 37 in a forward and rearward direction by which the front and rear insertion surfaces 41 and 42 are in contact with the first and second superposition surfaces 51 and 52, fourth and fifth folding lines 34 and 35 in an inclined direction by which the front and rear gas discharging surfaces 61 and 62 are in contact with the first and second superposition surfaces 51 and 52, and a horizontal sixth folding line 32 which is connected between the first and second folding lines 31 and 33.

The front and rear insertion surfaces 41 and 42 are formed in a quadrangular shape, the front and rear gas discharging surfaces 61 and 62 are formed in a polygonal shape having five vertices or more, and the first and second superposition surfaces 51 and 52 are formed in a triangular shape.

The first, second, and sixth folding lines 31, 33, and 32 are positioned in an horizontal straight line, and the third folding line 37 is positioned to be perpendicular to the first folding line 31.

The fourth and fifth folding lines 34 and 35 are formed as inclined lines that are connected between both ends of the third folding line 37 and a portion where the second and sixth folding lines 33 and 32 are in contact with each other.

Hereinafter, a method of manufacturing the diffuser pocket 30, which is formed as described above, will be described with reference to FIGS. 2 to 4.

As illustrated in FIG. 2, a single fabric is cut to form the quadrangular insertion portion 40, and the gas discharging portion 60 that is disposed at a left side of the insertion portion 40 and has a width in forward and rearward directions that is wider than that of the insertion portion 40.

The gas discharging portion 60 is folded counterclockwise at an angle of 180° based on the third folding line 37, which is a folding line in the forward and rearward directions corresponding to a left line of the insertion portion 40, so as to be in contact with a bottom surface of the insertion portion 40 (FIG. 3A).

Thereafter, the front and rear gas discharging surfaces 61 and 62 are folded to be close to each other at a predetermined angle, based on the fourth and fifth folding lines 34 and 35, which are inclined to face each other from both the ends of the third folding line 37 toward the inside of a central portion of the gas discharging portion 60, and the second folding line 33 that is a folding line positioned in a horizontal direction at a center of the gas discharging portion 60 (FIG. 3B).

In the state illustrated in FIG. 3B, the front and rear insertion surfaces 41 and 42 are folded upward at an angle of 90° based on the first folding line 31 which is positioned in a horizontal direction at a center of the insertion portion 40, so that the front and rear insertion surfaces 41 and 42 are in contact with each other, and the front and rear superposition surfaces 51 and 52 are folded upward at an angle of 90° based on the sixth folding line 32 that is a folding line positioned in the horizontal direction between the first folding line 31 and the second folding line 33 (FIG. 3C).

After folding the single fabric, the upper portions of the insertion portion 40, which has the front and rear insertion surfaces 41 and 42, are sewn together 71, and the upper portions and the left portions of the gas discharging portion 60, which has the front and rear gas discharging surfaces 61 and 62, are sewn together 72, and as a result, the process of manufacturing the diffuser pocket according to one exemplary embodiment of the present invention is completed.

Meanwhile, the first opening portion 30*a* is formed at a right end of the insertion portion 40, and the second opening portion 60*a* is formed at a lower end of the gas discharging portion 60.

The diffuser pocket is installed in the airbag cushion 20, and then at least the tip portion of the inflator 10 is inserted into the insertion portion 40 through the first opening portion 30*a*.

According to the diffuser pocket that is manufactured as described above and installed in the airbag cushion, when high-pressure gas is injected from the inflator 10 at the time of a vehicle collision, the high-pressure gas is discharged into the airbag cushion through the second opening portion 60*a* while being guided by the gas discharging portion 60 so that the airbag cushion is deployed.

According to the diffuser pocket according to the exemplary embodiment of the present invention, which is configured as described above, the lower portion of the insertion portion 40 at which the first folding line 31 is positioned, and the right portion of the gas discharging portion 60 at which the second folding line 33 is positioned, where a weight of the inflator is concentrated, and thermal damage mainly occurs when high-temperature and high-pressure gas is injected from the inflator 10, are folded without being sewn, thereby preventing damage due to a leakage of high-temperature and high-pressure gas through a gap formed by sewing thereof.

Particularly, according to the diffuser pocket, a superposition portion 50 is positioned at a boundary between the insertion portion 40 and the gas discharging portion 60, where the largest amount of thermal damage occurs due to high-temperature and high-pressure gas injected from the inflator, and is reinforced, thereby preventing damage to the boundary.

According to a second exemplary embodiment of the present invention, which is illustrated in FIG. 6, a direction in which high-pressure gas injected from the inflator 10 is discharged may be changed by changing an angle of the second folding lines 33, 33', and 33" that forms the right line of the gas discharging portion 60.

An inclination angle of the right line of the gas discharging portion 60 may be changed by adjusting an angle at which the gas discharging portion 60 is folded.

An angle at which high-pressure gas is discharged may be adjusted by inclinedly sewing the right portion of the gas discharging portion 60 at a predetermined angle, without changing an angle at which the gas discharging portion is folded.

According to a third exemplary embodiment of the present invention, which is illustrated in FIG. 7, the diffuser pocket 30 is enclosed with a reinforcing fabric 80, thereby reducing damage to the diffuser pocket 30 and the airbag cushion 20.

The reinforcing fabric 80 may be made of a strong material in order to prevent damage to the airbag cushion 20 due to high-pressure gas.

The reinforcing fabric 80 is formed to have a shape similar to that of the diffuser pocket 30, and the reinforcing fabric 80 and the diffuser pocket 30 are coupled to each other by sewing 81.

The reinforcing fabric 80 has a gas guide portion 82 that is formed to be extended downward from the diffuser pocket 30, and the gas guide portion 82 has a lower end portion that is closed by sewing 82', and discharge openings 80*b* and 80*c* are formed at both side portions of the gas guide portion 82, such that high-pressure gas, which is discharged from the second opening portion 60*a* of the diffuser pocket, may be discharged while being distributed to both sides of the airbag cushion through both the side portions of the gas guide portion 82.

The folding line, which has been described above, is a virtual line for explaining a state in which the diffuser pocket according to the present invention is folded, and the folding line is not actually indicated on the diffuser pocket of the present invention, and therefore, whether or not the folding line is present cannot affect the protective scope of the present invention.

As an attaching means for attaching the upper portions of the front and rear insertion surfaces of the present invention and/or the side portions that are disposed at the upper side of the front and rear gas discharging surfaces, a sewing method has been exemplified, but other attaching means, for example, an adhesive, may be used.

Directional terms, which has been described in the present invention, for example, front and rear, upper and lower, and left and right, may be varied in accordance with an angle at which the diffuser pocket is viewed, and therefore the directional terms cannot limit the protective scope of the present invention.

While the exemplary embodiments of the present invention have been illustrated and described above, the present invention is not limited to the aforementioned specific exemplary embodiments, various modifications may be made by a person with ordinary skill in the art to which the present invention pertains without departing from the subject matters of the present invention that are claimed in the claims, and these modifications should not be appreciated individually from the technical spirit or prospect of the present invention.

What is claimed is:

1. A diffuser pocket for an airbag, comprising:
   an insertion portion into which at least a tip portion of an inflator, which injects high-pressure gas at the time of a vehicle collision, is inserted; and
   a gas discharging portion which guides and discharges the high-pressure gas injected from the inflator to an airbag cushion,
   wherein the insertion portion includes front and rear insertion surfaces that are folded upward based on a first folding line positioned at a center of the insertion portion, and upper portions of the front and rear insertion surfaces are joined with each other by an attaching means,
   wherein the gas discharging portion includes front and rear gas discharging surfaces that are folded to one side based on a second folding line positioned at a center of the gas discharging portion, the second folding line forms a right line of the gas discharging portion, and upper portions and left portions of the front and rear gas discharging surfaces are joined with each other by a second attaching means,
   wherein a third folding line forming a left line of the insertion portion and perpendicular to the first and second folding lines, prior to folding, is provided between the insertion portion and the gas discharging portion, wherein the discharging portion is folded downward based on the third folding line with respect to the insertion portion.

2. The diffuser pocket of claim 1, wherein the diffuser pocket is manufactured using a single fabric.

3. The diffuser pocket of claim 1, wherein sewing is used as the attaching means.

4. The diffuser pocket of claim 1, wherein the insertion portion is formed in a quadrangular shape,
   the first and second superposition surfaces are formed in a triangular shape, and the discharging portion is formed in a polygonal shape having five vertices or more.

5. The diffuser pocket of claim 1, wherein a first superposition surface is positioned between portions where the front insertion surface and the front gas discharging surface overlap each other, and a second superposition surface is positioned between portions where the rear insertion surface and the rear gas discharging surface overlap each other.

6. The diffuser pocket of claim 5, wherein the first and second superposition surfaces are positioned between the front and rear insertion surfaces and the front and rear gas discharging surfaces by folding superposition portions positioned between the insertion portion and the gas discharging portion.

7. The diffuser pocket of claim 6, wherein the first and second superposition surfaces are formed by folding the third folding line, so that a sixth folding line, which is positioned between the first and second folding lines, is in contact with a part of the first folding line, and folding fourth and fifth folding lines that connects portions where front and rear ends of the third folding line are in contact with the second and sixth folding lines.

8. The diffuser pocket of claim 1, wherein a reinforcing fabric, which has a gas guide portion that is extended downward from the diffuser pocket, is coupled to the diffuser pocket.

9. The diffuser pocket of claim 8, wherein the gas guide portion of the reinforcing fabric has a lower end that is closed by being sewed, and gas discharging openings that are formed at both sides of the gas guide portion.

10. A method of manufacturing a diffuser pocket for an airbag, comprising:
    a cutting process for cutting a single fabric so as to form an insertion portion into which a tip portion of an inflator is inserted, and a gas discharging portion which is disposed at a left side of the insertion portion so as to guide and discharge high-pressure gas injected from the inflator to an airbag cushion;
    a folding process for folding the gas discharging portion to a bottom side of the insertion portion based on a first folding line that is a left line of the insertion portion, folding front and rear insertion surfaces of the insertion portion upward based on a second folding line that is positioned in a horizontal direction at a center of the insertion portion, and folding front and rear gas discharging surfaces of the gas discharging portion to one side based on a third folding line that is positioned in the horizontal direction at a center of the gas discharging portion, wherein the first folding line is perpendicular to the second and third folding lines, prior to folding; and
    a sewing process for sewing and joining upper portions of the front and rear insertion surfaces, and upper portions and left portions of the front and rear gas discharging surfaces.

11. The method of claim 10, wherein in the cutting process, the insertion portion is formed in a quadrangular shape, the gas discharging portion is formed in a polygonal shape having six vertices or more that has a width in a forward and rearward direction wider than that of the insertion portion.

12. The method of claim 10, wherein in the folding process, the insertion portion and the gas discharging portion are folded so that parts of the insertion portion and the gas discharging portion overlap each other.

13. The method of claim 12, wherein the insertion portion and the gas discharging portion are folded so that a superposition surface is positioned between portions where parts of the insertion portion and the gas discharging portion overlap each other.

14. The method of claim 13, wherein the superposition surface is positioned between portions where the insertion portion and the gas discharging portion overlap each other, by folding the diffuser pocket based on a fourth folding line that is connected between the second folding line positioned at the center of the insertion portion and the third folding line positioned at the center of the gas discharging portion, and based on a fifth folding line that is inclinedly connected to front and rear ends of the first folding line which is the left line of the insertion portion and the third folding line positioned at the center of the gas discharging portion.

\* \* \* \* \*